(12) United States Patent
Tzadikario

(10) Patent No.: US 7,540,025 B2
(45) Date of Patent: May 26, 2009

(54) MITIGATING NETWORK ATTACKS USING AUTOMATIC SIGNATURE GENERATION

(75) Inventor: Rephael Tzadikario, Kfar Saba (IL)

(73) Assignee: Cisco Technology, Inc., San Jose, CA (US)

( * ) Notice: Subject to any disclaimer, the term of this patent is extended or adjusted under 35 U.S.C. 154(b) by 737 days.

(21) Appl. No.: 10/992,265

(22) Filed: Nov. 18, 2004

(65) Prior Publication Data

US 2006/0107321 A1    May 18, 2006

(51) Int. Cl.
G06F 11/00 (2006.01)
(52) U.S. Cl. .................................... 726/22; 726/25
(58) Field of Classification Search .............. 726/22, 726/23, 24, 25
See application file for complete search history.

(56) References Cited

U.S. PATENT DOCUMENTS

| | | | |
|---|---|---|---|
| 5,067,074 A | 11/1991 | Farel et al. | |
| 5,841,775 A | 11/1998 | Huang | |
| 6,005,926 A | 12/1999 | Mashinsky | |
| 6,279,113 B1 | 8/2001 | Vaidya | |
| 6,314,463 B1 | 11/2001 | Abbott et al. | |
| 6,351,775 B1 | 2/2002 | Yu | |
| 6,397,335 B1 | 5/2002 | Franczek et al. | |
| 6,487,666 B1 * | 11/2002 | Shanklin et al. | 726/23 |
| 6,513,122 B1 | 1/2003 | Magdych et al. | |
| 2002/0083175 A1 | 6/2002 | Afek et al. | |
| 2004/0093513 A1 | 5/2004 | Cantrell et al. | |
| 2005/0262560 A1 * | 11/2005 | Gassoway | 726/22 |

FOREIGN PATENT DOCUMENTS

| | | |
|---|---|---|
| WO | WO 03/050644 | 6/2003 |
| WO | WO03050644 A2 * | 6/2003 |

OTHER PUBLICATIONS

Coull, S.; Branch, J.; Szymanski, B.; Breimer, E., "Intrusion detection: a bioinformatics approach," Computer Security Applications Conference, 2003. Proceedings. 19th Annual , vol., no., pp. 24-33, Dec. 8-12, 2003.*
Bennett, J.C.R. et al. "Hierarchical Packet Fair Queueing Algorithms", 1996.
Bennett, J.C.R. et al. "High Speed, Scalable, and Accurage Implementation of Fair Queueing Algorithms in ATM Networks", 1996.
Bennett, J.C.R. et al. "WF2Q: Worst-Case Fair Weighted Fair Queueing", 1996.

(Continued)

Primary Examiner—Kimyen Vu
Assistant Examiner—Yogesh Paliwal
(74) Attorney, Agent, or Firm—Abelman, Frayne & Schwab

(57) ABSTRACT

A computer-implemented method for mitigating attacks of malicious traffic in a computer network includes receiving a set of attack sequences, including first traffic sequences suspected of containing the malicious traffic, analyzing the attack sequences so as to automatically extract a regular expression that matches at least a portion of the attack sequences in the set, and comparing second traffic sequences to the regular expression in order to identify the second traffic sequences that contain the malicious traffic.

76 Claims, 6 Drawing Sheets

OTHER PUBLICATIONS

Chiussi, F.M. et al. "Implementing Fair Queueing in ATM Switches: The Discrete-Rate Approach", 1998.

Chiussi, F.M. et al. "Minimum-Delay Self-Clocked Fair Queueing Algorithm for Packet-Switched Networks", 1998.

Demers, A. et al. "Analysis and Simulation of a Fair Queueing Algorithm", 1989 Association for Computing Machinery.

Eckhardt, D.A. et al. "Effort-limited Fair (ELF) Scheduling for wireless Networks", IEEE INFOCOM 2000.

Golestani, S.J. "Networks Delay Analysis of a Class of fair Queueing Algorithms", IEEE Journal on Selected Areas in Communications, vol. 13, No. 6, Aug. 1995, pp. 1057-1070.

Golestani, S.J. "A self-Clocked fair Queueing Scheme for Broadband Applications", IEEE 1994, pp. 5c.1.1-5c1.11.

Greenberg, Albert G. et al. "How Fair is Fair Queuing?" Journal of the Association for Computing Machinery vol. 39, No. 3, Jul. 1992, pp. 568-598.

Parekh, A.K.J. "A Generalized Processor Sharing Approach to Flow Control in Integrated Services Networks", Ph.D. Dissertation Massachusetts Institute of Technology, Feb. 1992.

Parekh, A.K.J. "A Generalized Processor Sharing Approach to Flow Control in Integrated Services Networks: The Multiple Node Case", IEEE/ACM Transactions on Networking vol. 2, No. 2, Apr. 1994, pp. 137-150.

Parekh, A.K.J. "A Generalized Processor Sharing Approach to Flow Control in Integrated Services Networks: The Single-Node Case", IEEE/ACM Transactions on Networking vol. 1, No. 3, Jun. 1993, pp. 344-357.

"Quality of Service Networking", downloaded from the web (address: http://www.cisco.com/univercd/cc/td/doc/cisintwk/ito_doc/qos.htm), Cisco Systems, Inc. 2002.

Rexford, J.L. et al. "Hardware Efficient Fair Queueing Architectures for high-Speed networks", IEEE 1996, pp. 5d.2.1-5d.2.9.

Shreedhar M. et al. "Efficient Fair Queueing Using Deficit Round-Robin", IEEE/ACM Transactions on networking vol. 4, No. 3, Jun. 1996, pp. 375-385.

Stiliadis, D. et al. "Frame-Based Fair Queueing: A New Traffic Scheduling Algorithm for Packet-Switched Networks", Jul. 1995, pp. 1-43.

Provos, "A Virtual Honeypot Framework", Technical Report 03-1, CITI (University of Michigan), Oct. 2003.

Kim, et al., "Autograph: Toward Automated, Distributed Worm Signature Detection", (Intel Research Seminar, Seattle, Washington, Sep. 2004).

Shamir, "Algorithms for molecular Biology" (Tel Aviv University, Lecture 2, Nov. 2001).

B. Madhusudan, et al., "Design of a System for Real-Time Worm Detection", Published in 12$^{th}$ Annual IEEE Symposium on High Performance Interconnects (Hot-1), Aug. 2004, Stanford, CA, pp. 77-83.

* cited by examiner

MITIGATING NETWORK ATTACKS USING AUTOMATIC SIGNATURE GENERATION

FIELD OF THE INVENTION

The present invention relates generally to computer networks, and specifically to methods and systems for mitigating attacks of malicious traffic in computer networks.

BACKGROUND OF THE INVENTION

In recent years the Internet has seen the eruption of numerous fast-spreading worm attacks. Unlike viruses, a worm is a self-propagating code that automatically spreads itself from one infected machine to others. The worm author typically identifies a security vulnerability in a relatively widespread service. The author then devises a computer program that scans the Internet for vulnerable servers, utilizes the security vulnerability to take control of these servers and transfers the malicious program code to each of the attacked servers, thus "infecting them with the worm." Each infected server continues to scan the Internet and infect new servers, resulting in an exponential spreading pattern. Worm infection is often a method for launching coordinated Distributed Denial of Service (DDoS) attacks, in which a target host is bombarded with a large amount of traffic from multiple sources, eventually preventing it from serving its legitimate clients.

Worm attacks may spread so quickly that within seconds after a new attack is initiated, it is already widespread, infects many servers, and causes significant worldwide service disruptions. Research and simulations show the importance of beginning countermeasures against worm attacks as soon as possible after the initial outbreak. Provos, in a research paper entitled "A Virtual Honeypot Framework", Technical Report 03-1, CITI (University of Michigan), October 2003, which is incorporated herein by reference, demonstrates by simulation that in order to have hope of containing an epidemic before 50% of the vulnerable hosts become infected, preventive action must begin before 5% of these hosts are infected.

Two major approaches are known in the art for mitigating Internet attacks: signature-based and anomaly-based. Worm signatures are byte patterns that typically appear as part of malicious traffic. These patterns are often parts of the payload code that the worm uses in its infection attempts. Traffic sequences with payloads that match a worm signature can be assumed to carry malicious code. The signature-based approach, utilized in Intrusion Detection Systems (IDS) and Intrusion Prevention Systems (IPS), provides detection and prevention of known worms by maintaining an updated worm-signature database and blocking every session that contains a worm signature.

The anomaly-based approach establishes a baseline of normal network behavior, and interprets deviations from that baseline as suspicious. This technique enables an anomaly detector to identify new attacks as they emerge, without the need for an updated signature database. However, to identify which sources are infected and should be blocked, the anomaly detection needs to wait for these sources to generate an anomaly. Consequently, some attack traffic is allowed to pass through into the protected network prior to blocking the source.

Several schemes have been proposed in which anomaly detection and signature-based detection are combined in a single solution. For example, Kim et al., in a paper entitled "Autograph: Toward Automated, Distributed Worm Signature Detection," (Intel Research Seminar, Seattle, Wash., September 2004), which is incorporated herein by reference, describe a system for automatic generation of worm signatures. The system uses anomaly detection for collecting malicious traffic sequences and feeds them to a signature generator that attempts to find recurring byte patterns. The concept of combining anomaly detection with signature-based detection is also described in PCT Patent Publication WO 03/050644 A2, entitled "Protecting Against Malicious Traffic," which is incorporated herein by reference.

The present invention will be more fully understood from the following detailed description of the embodiments thereof, taken together with the drawings in which:

DETAILED DESCRIPTION OF EMBODIMENTS

Figure 1:
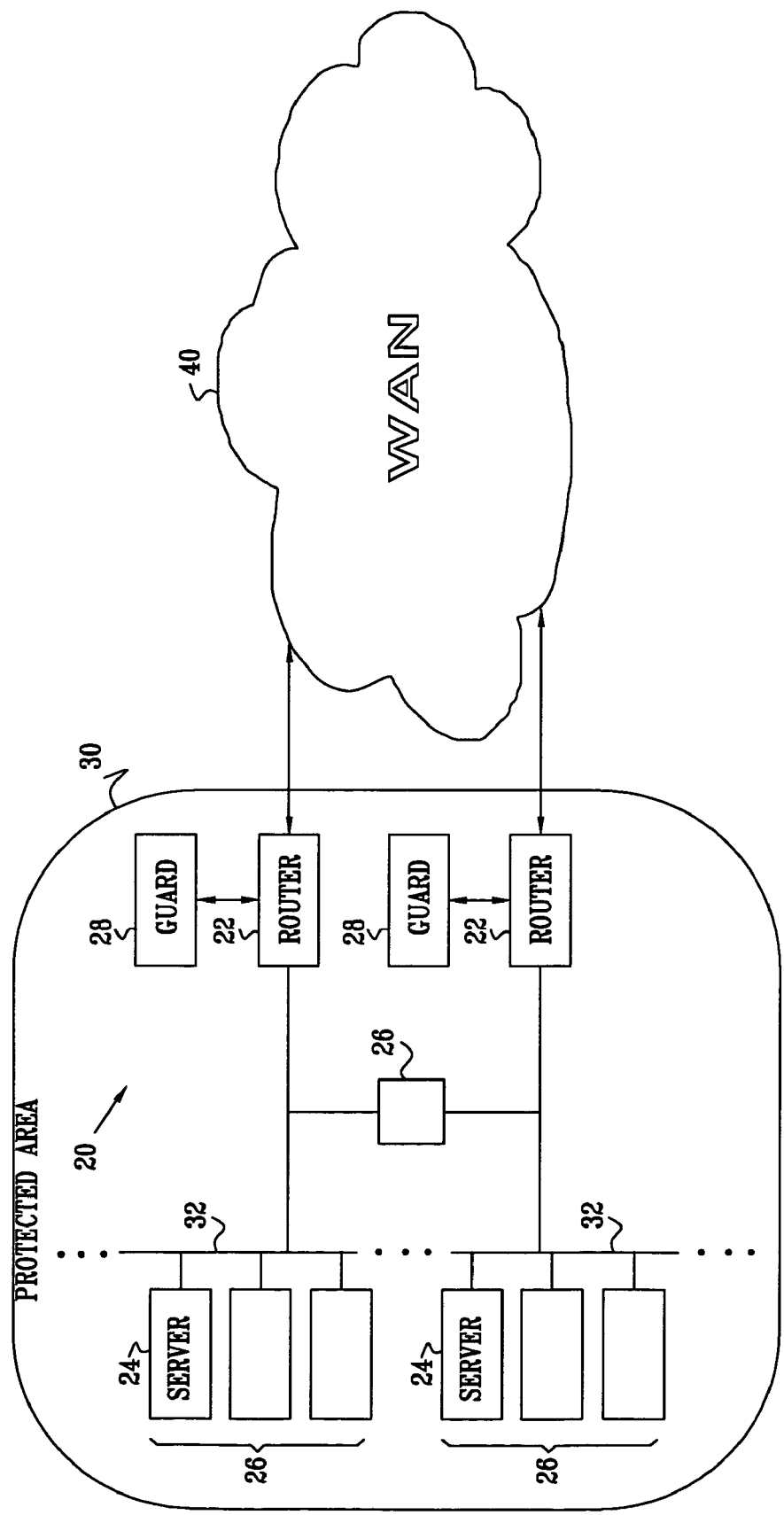
FIG. 1 is a block diagram that schematically illustrates a computer network with guard device, in accordance with an embodiment of the present invention.

Neither signature-based nor anomaly-based protection schemes alone can provide a comprehensive solution in the critical, early stages of a worm attack. Signature-based detection is ineffective in the early stages of an attack when there is no worm signature in the database. The anomaly-based approach does not provide complete containment, as infected hosts are only blocked after they have generated an anomaly, meaning that some attack traffic has already propagated successfully into the protected network.

Signature-based systems typically require human intervention, which slows the system reaction time considerably. Signature-based protection systems typically require human experts to examine traffic sessions and manually generate common signatures before these signatures can be used for blocking. There is, therefore, strong motivation to devise computer network detection and protection schemes that are effective in combating unknown Internet worms rapidly, without requiring human intervention.

Embodiments of the current invention provide a system and method for automatic, rapid containment of unknown Internet worms using a novel algorithm for generation of worm signatures. The signature generation algorithm uses "regular expressions" as a way to formulate common byte patterns that appear in traffic sequences. A regular expression is a byte sequence that may contain "special characters," which replace one or more characters in a string and serve as "wildcards." A regular expression functions as a template that can represent a variety of similar strings, rather than an explicit, single string.

A signature-based detector that uses regular expressions to formulate worm signatures can readily identify malicious sequences even if their payloads are not identical to a single string. Worms often introduce variations in their payload content, typically by inserting NOP characters or introducing minor modifications in their code, in order to evade the more naïve signature-based systems. Polymorphic worms, which modify their payload, are a particular challenge to signature generators. Signature generation based on embodiments of the present invention is capable of automatically determining worm signatures even in the presence of such variations.

Some embodiments of the present invention combine the benefits of anomaly detection and automatic signature generation. Anomaly detection is used to identify the first infected machines sending worm traffic into or from a protected network. Traffic sequences from the infected machines are then collected and analyzed to generate worm signatures. Once a signature generator has generated a worm signature, it distributes the signature to all Intrusion Protection Systems (IPS) in the protected network for use in blocking all sessions containing the signature, as well as identifying additional machines as infected by matching the worm signature to the traffic transmitted by these machines. The inventors have found that it is possible to generate a regular expression in this manner within one minute of the initial detection of a worm attack, and typically within five seconds, or even one second, whereas even an expert human operator typically requires significantly more time to find the worm signature.

Definitions

The following is a non-exhaustive list of technical terms that are used in the present patent application and in the claims. The list is provided here for the convenience of the reader. Certain of the items in the list are specific to embodiments of the present invention.

Sequence: a sequence is a string of characters of arbitrary length.

Sequence alignment: placing two sequences such that every character in one sequence is aligned with a character in the other, sometimes using a special "gap" character (marked with a "-"). For example, the two sequences:
"hello,world"
"hell,mylord"
Can be aligned in the following way:
"hello,---world"
"hell-,my-lor-d"

Character alignment score: a numerical score for aligning two characters, which is positive if the alignment is good (e.g., aligning "a" with "a"), and negative if the alignment is bad (e.g. aligning "a" with "7").

Gap scores: a special case of the character alignment score, used when a character is aligned with a "gap" character introduced by the alignment process. In the simplest case, a fixed, negative score is assigned whenever a character is aligned with a gap. More complex scoring schemes assign a higher penalty (negative score) for opening a gap in an alignment, and a small penalty for extending an existing gap. Either type of gap score, as well as other gap scoring schemes, may be used in embodiments of the present invention.

Sequence alignment score: the sum of the character alignment scores (including gap scores) for all of the aligned characters. In the "sequence alignment" example above, if we give +10 score for aligning identical characters and −5 for aligning a character with a gap or a different character, the score for that specific alignment would be 8*10+6*(−5).

Best alignment of two sequences: given two sequences, their best alignment is the alignment that maximizes the sequence alignment score. (Of course, the polarity of the scores could be reversed, in which case the best alignment would be the one that minimizes the sequence alignment score, i.e., minimizes the alignment distance, or cost.)

Regular expression: a character sequence that may contain additional "special characters," and thus functions as a template for character strings, rather than as an explicit single string. The special characters are given special values that do not appear in normal input sequences (either using escape sequences, or any other character representation scheme). The special characters that are typically used in the embodiments described below are:
"*": matches any zero or more characters.
"?": matches any single character.
[<char-set>]: matches any character enclosed in the brackets, e.g., [1234567890] matches all digits.

For example, the two sequences given above can be described by the regular expression "hell?,*[wl]or?d".

System Description

FIG. 1 is a block diagram that schematically illustrates a computer network 20 with a guard device 28, in accordance with an embodiment of the present invention. A protected area 30 of network 20 communicates with a wide-area network (WAN) 40, typically the Internet, through one or more routers 22. Protected area 30 comprises various network elements 26, such as servers 24, clients, switches, internal routers, and bridges, typically connected by one or more local-area networks (LANs) 32. Typically, although not necessarily, protected area 30 comprises a private network, such as an enterprise or campus network. It should be noted that the network configuration shown in FIG. 1 was chosen as an example for clarity of explanation. Various alternative configurations for protecting area 30 using guard device 28 will be apparent to those skilled in the art. Such configurations may comprise, for example, connecting the guard device to an enterprise-LAN switch. Alternatively or additionally, guard device 28 may be configured as a detector only, receiving a copy of the network traffic and delivering worm signatures to an existing intrusion prevention system.

To prevent the infection of servers 24 with a worm, guard device 28 intercepts incoming packets from WAN 40 that are addressed to network elements 26. Guard device 28 analyzes these incoming packets in order to detect packets that are suspected of being infected with a worm, typically using anomaly detection techniques described below. Once an anomalous traffic pattern has been detected, guard device 28 collects and records traffic, which is suspected of containing worm infection attempts. The guard device analyzes the recorded traffic, using techniques described below, in order to generate representative worm signatures. These signatures are used for identifying infected traffic and enable guard device 28 to block such traffic from reaching servers 24 inside protected area 30. Non-infected traffic is forwarded to its intended destinations.

Alternatively or additionally, guard device 28 monitors outgoing packets sent from servers 24 via WAN 40 to network elements outside protected area 30. Guard device 28 analyzes the outgoing traffic using anomaly detection techniques similar to those described below. Once an anomalous traffic pattern has been detected, originating from one of the servers 24 inside protected area 30, guard device 28 similarly collects malicious traffic from the infected server, analyzes it and extracts representative worm signatures for blocking future malicious traffic. By detecting and blocking infected outgoing packets, guard device 28 prevents servers 24 infected with a worm from establishing connections with servers outside protected area 30. As a result, infected servers 24 are not able to compromise outside servers or to participate in a Distributed Denial of Service (DDoS) attack on network elements outside protected area 30. Blocking infected traffic also relieves pressure on the links between routers 22 and WAN 40, so that legitimate traffic is not impeded by malicious activity.

Figure 2:
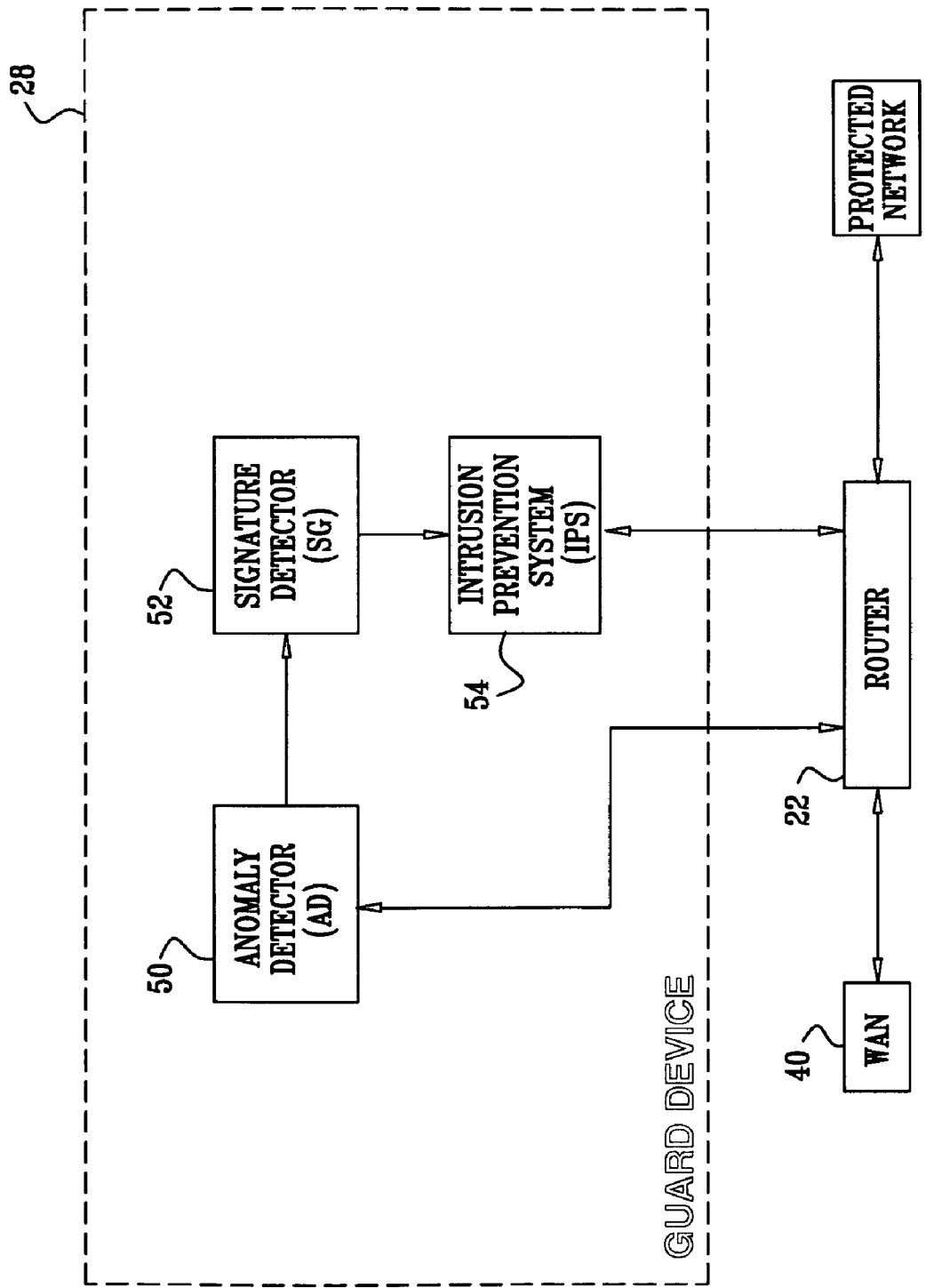
FIG. 2 is a block diagram that schematically shows functional details of a guard device, in accordance with an embodiment of the present invention.

FIG. 2 is a block diagram that schematically shows functional building blocks of guard device 28, in accordance with an embodiment of the present invention. Guard device 28 is shown to consist of three building blocks that participate in the worm detection and protection process:

An anomaly detector 50 for detecting suspicious behavior of potentially infected servers and for collecting malicious traffic sequences for analysis;

A signature generator 52 for generating representative worm signatures based on recorded malicious traffic; and An intrusion prevention system (IPS) 54, which uses the signatures generated by signature generator 52 to identify infected traffic and prevent it from entering or leaving protected area 30.

While functional blocks 50, 52 and 54 are shown as separate entities for the sake of conceptual clarity, they may be implemented either as separate platforms or as a single computing platform. Further aspects of the operation of guard device 28 are described in the above-mentioned PCT Patent Publication WO 03/050644 A2.

Although in FIGS. 1 and 2 each guard device 28 is shown connected directly to a single adjacent router 22, alternative configurations will be apparent to those skilled in the art. For example, there need not be a one-to-one correspondence between guard devices and routers, and guard devices and routers may be separated by a physical or network distance, such as by a switch.

Additionally or alternatively, the guard functionality may be distributed among multiple guard devices 28, at one or more access points to protected area 30. In applications using more than one guard device, there need not be an identical number of anomaly detectors 50, signature generators 52 and intrusion prevention systems 54. Guard devices 28 may share one or more common data repositories, or may otherwise communicate with each other, such as for performing aggregated analysis and/or maintaining a common record of suspected sources of malicious traffic.

Typically, guard device 28 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, guard device 28 may be implemented in dedicated hardware logic, or using a combination of hardware and software elements. The guard device may be a standalone unit, or it may alternatively be integrated with other communication or computing equipment, such as router 22, a firewall, or an intrusion detection system (not shown).

Methods for Detecting and Mitigating Attacks

Figure 3:
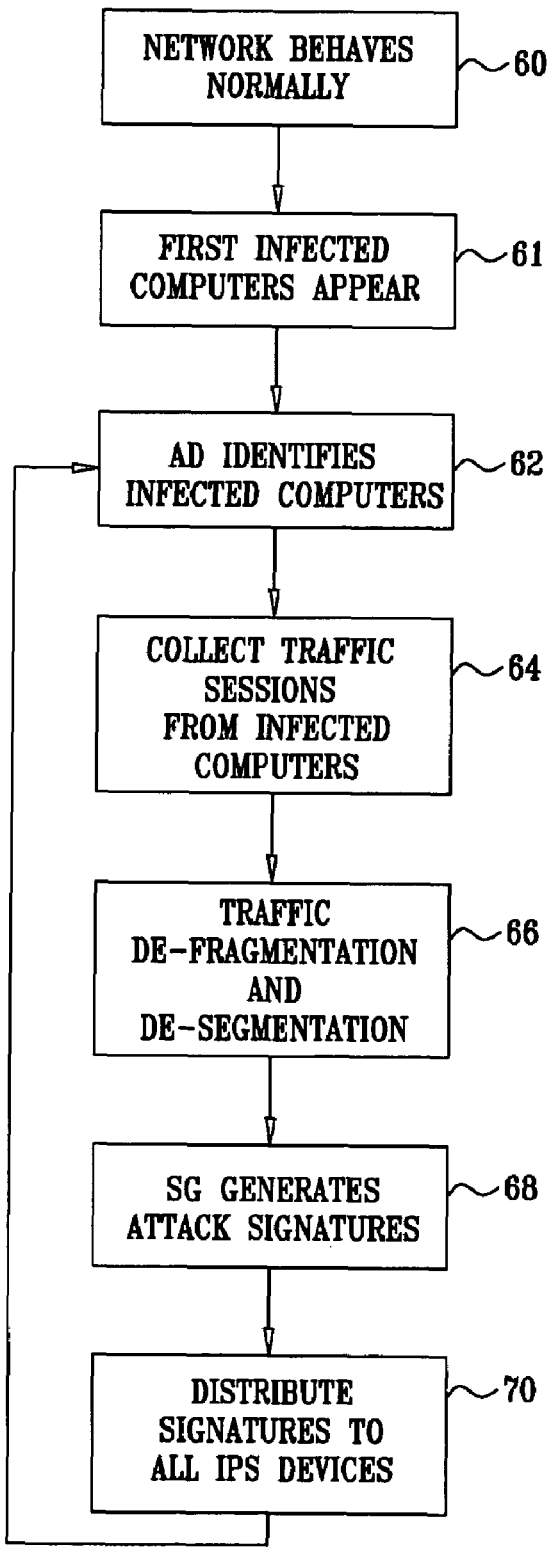
FIG. 3 is a flow chart that schematically illustrates a method for mitigating network attacks, in accordance with an embodiment of the present invention.

FIG. 3 is a flow chart that schematically illustrates a method for mitigating network attacks, in accordance with an embodiment of the present invention. Anomaly detector 50 monitors ingoing and outgoing traffic at a normal network behavior step 60, and establishes a baseline pattern that describes the normal network behavior. Anomaly detector 50 monitors the network traffic continuously and attempts to identify deviations from the normal, baseline pattern.

There are numerous techniques known in the art for detecting anomalous network behavior that may be attributed to worm activity. Some exemplary methods are described in the above-mentioned PCT Patent Publication WO 03/050644 A2. For example, an unusually high rate of packets, such as SYN packets, from the same source to multiple destination addresses may be interpreted as an indication of worm-generated "scanning" traffic, which the worm uses in searching for vulnerable hosts. An anomalous pattern of destination addresses from the same source may also be interpreted as malicious. Packets addressed to invalid destinations, such as non-existing destination addresses, or destination addresses without a server, may be considered likely to be worm-generated. An unusually high rate of packets, typically SYN packets, for a particular application or port, when addressed to destinations that are not servers for the particular application or port, may also be interpreted as a likely indication of worm-generated traffic. Any one or more of the anomaly detection techniques described above, as well as others, which will be apparent to those skilled in the art, may be used in embodiments of the present invention.

As a worm attack spreads, some malicious traffic begins to appear, at an initial infection step 61. Infected servers (or other host computers) begin spreading the worm and thereby deviate from their normal, baseline behavior patterns. The worm traffic typically originates outside protected area 30, but it may also infect one or more servers inside the protected area, since there are no valid worm signatures in-place at this time. Anomaly detector 50 detects the abnormal behavior of the infected servers (inside and/or outside protected area 30), at an identification step 62, typically using any or all of the anomaly detection techniques described above.

Contrary to other protection schemes known in the art, in embodiments of the present invention, anomaly detector 50 does not discard all traffic from infected hosts immediately. Rather, once anomaly detector 50 has identified a host (either inside or outside protected area 30) as infected, it collects and records a buffer of potentially malicious traffic from the infected host, at a traffic collection step 64. The recorded buffer is eventually used for extracting worm signatures; therefore, it is important to collect a sufficient number of infected traffic sequences. In some embodiments, anomaly detector 50 may use a technique called "virtual honeypotting" to collect infected traffic. In this technique, anomaly detector 50 mimics the behavior of a host and responds to a worm scan attempt. For example, the anomaly detector may send a SYN ACK packet back to the IP source address from which a suspicious SYN packet was received. Thus, anomaly detector 50 establishes a connection with the infecting server and solicits it to generate traffic, which contains the worm signature. Honeypotting in this manner is an effective method for obtaining malicious traffic for analysis.

The recorded buffers of potentially malicious traffic are transferred to signature generator 52 for analysis. Signature generator 52 typically removes the protocol-specific parts of the traffic sequences, at a re-formatting step 66, and focuses on the message payloads. For example, this protocol re-formatting may include IP de-fragmentation, TCP de-segmentation, and/or URL decoding. (URL coding, as defined in HTML, uses a number of special characters in order to represent other characters in a URL, and may be used by a worm in an attempt to disguise its signature. URL decoding returns coded characters to their clear form.) Signature generator 52 uses the message sequences to generate one or more representative worm signatures, at a signature generation step 68. For this purpose, the signature generator uses an algorithm based on regular expressions, as described below with reference to FIGS. 4-6.

The worm signatures thus extracted are transferred to intrusion prevention system (IPS) 54, at a signature distribution step 70. IPS 54 then blocks all ingoing and outgoing traffic containing these signatures. In some embodiments, protected area 30 may include several intrusion prevention systems 54 and/or several signature generators 52, whereupon any worm signature generated is distributed to all intrusion prevention systems 54.

As the worm attack progresses, anomaly detector 50 continues to monitor the network, at identification step 62, to identify new infected servers and/or to record malicious traffic from known infected servers. Updated traffic buffers recorded by anomaly detector 50 are transferred to signature generator 52 for refining known worm signatures and generating new signatures.

Figure 4:
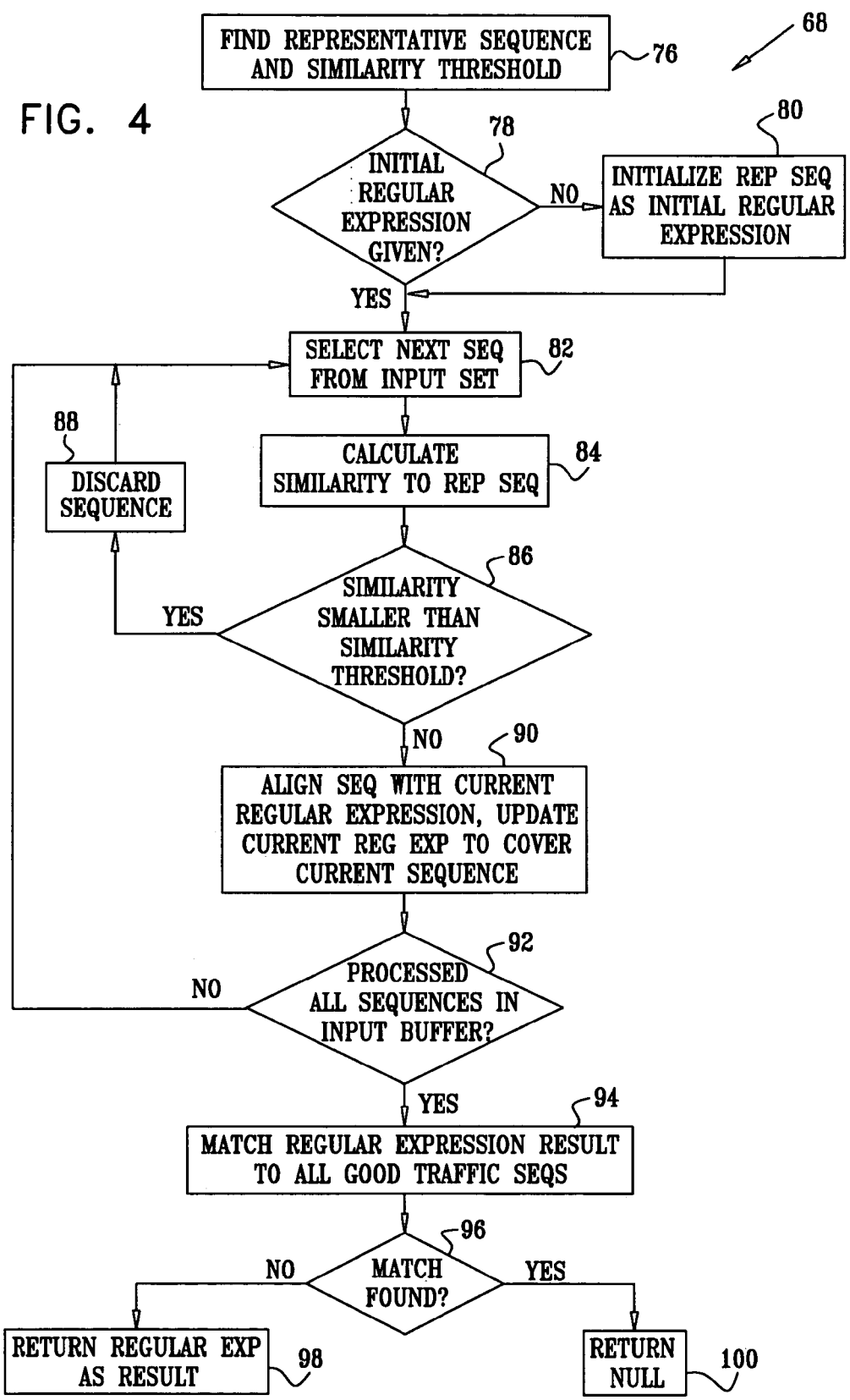
FIG. 4 is a flow chart that schematically illustrates a method for generating a worm signature from a set of input traffic sequences, in accordance with an embodiment of the present invention.

FIG. 4 is a flow chart that schematically shows details of signature generation step 68, in accordance with an embodiment of the present invention. This method may be used generally for generating a worm signature from a set of input traffic sequences. The inputs to the algorithm are the following:

1. A set of attack traffic payload sequences (following de-fragmentation and de-segmentation at step 66, as described) that contain worm infection attempts. Typically, the set of sequences may contain a small number of false positives (i.e., sequences that are not related to worm infection but are rather copies of innocent traffic packets).
2. "FP"—a real number, which denotes the maximum expected fraction of false positive sequences in the input set.
3. A set of innocent traffic sequences that must not be matched by the resulting signature.
4. Optionally, an initial regular expression denoting an existing signature. A regular expression is given in cases in which the algorithm is used for refining a known signature using newly recorded sequences.

Initially, signature generator 52 finds a representative sequence and a true positive similarity threshold for the input set of attack sequences, at a representative finding step 76. The method for finding the representative sequence is shown in detail in FIG. 5 below. The representative sequence is typically chosen to be one of the input set attack traffic payload sequences that has a high likelihood of being a true positive. Typically, an operator of system 20 inputs a value of the parameter FP for use by the signature generator in the method that follows. Signature generator 52 checks whether an initial regular expression is available at an initial expression checking step 78. If no initial expression is available, signature generator 52 assigns the true positive representative sequence found at step 76 to be the initial regular expression at an initial assignment step 80. Otherwise, the input regular expression is used as the initial regular expression. The initial regular expression may be modified in the course of processing the input set, as described below.

Signature generator 52 selects an arbitrary attack sequence from the input set at a selection step 82. The signature generator calculates the alignment score (as defined above) of the selected attack sequence relative to the current regular expression, at a similarity calculation step 84. The calculation may use a method such as "pairwise align," as described in Appendix A below, or any other equivalent algorithm. The signature generator then checks the calculated alignment score against the true positive similarity threshold, at threshold comparison step 86. If the score is less than the threshold, the signature generator concludes that the current sequence is not infected by the worm represented by the current regular expression. In this case, the current sequence is discarded at a discard step 88. Signature generator 52 then returns to selection step 82 to select a different sequence.

If the calculated alignment score is larger than the true positive similarity threshold, as checked at step 86, signature generator 52 finds the best alignment of the selected sequence with the current regular expression, at an expression updating step 90. The calculation may use a method such as "reg-exp align," as described in Appendix A below, or any other equivalent algorithm. Finding the best alignment may include extending or otherwise updating the current regular expression to match the selected sequence.

Signature generator 52 checks whether all attack sequences have now been processed, at a buffer checking step 92. If not, the signature generator returns to selection step 82 and continues the same process for all remaining attack sequences. Once all the attack sequences in the buffer have been processed in this manner, signature generator 52 possesses a regular expression corresponding to a worm signature that matches all of the attack sequences in the input set that were found to be similar enough to the true positive representative sequence.

The next requirement is to make sure the generated regular expression does not match any of the innocent sequences provided as input. Signature generator 52 attempts to align the regular expression with all innocent sequences provided as input, at an innocent matching step 94. It then checks whether any of the innocent sequences match the regular expression, at a match checking step 96. If the regular expression does not match any of the innocent sequences, signature generator 52 determines the regular expression to be a valid worm signature at a signature found step 98. This signature is distributed to IPS 54 at step 70 (FIG. 3). If, on the other hand, the regular expression matches one or more innocent sequences, the expression is discarded and the algorithm returns a null, in a null returning step 100. In this case, the method of FIG. 4 may be repeated, for example, using a new input set in order to find a more restricted regular expression that will not match the innocent sequences. Alternatively, if a regular expression matches one or more of the innocent sequences, signature generator 52 may modify the regular expression so as to exclude the innocent sequences, while maintaining the alignment of the regular expression alignment with the attack sequences.

Figure 5:
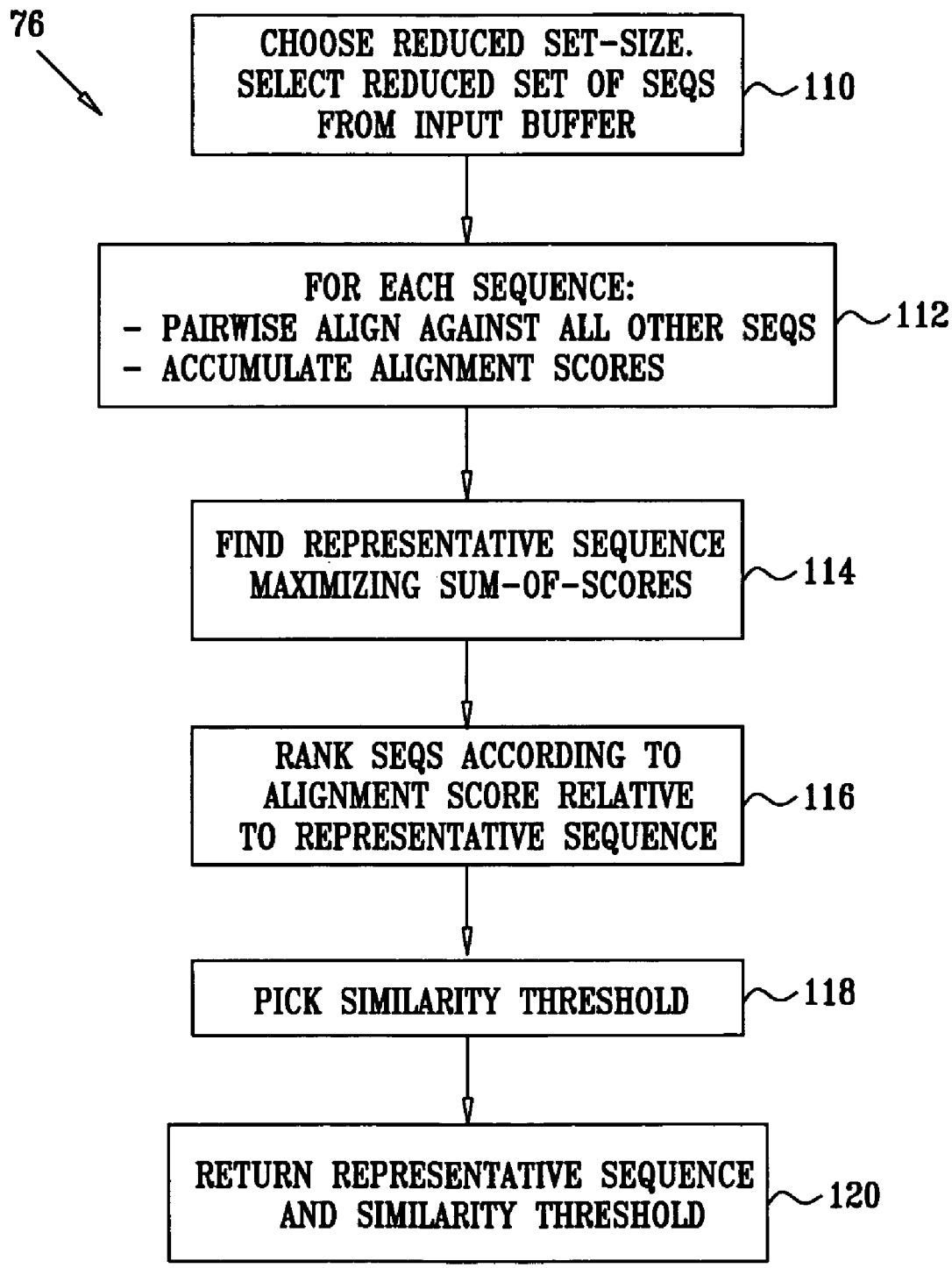
FIG. 5 is a flow chart that schematically illustrates a method for finding a representative sequence within a set of input traffic sequences, in accordance with an embodiment of the present invention.

FIG. 5 is a flow chart that schematically shows details of representative finding step 76, in accordance with an embodiment of the present invention. This method is used for finding a representative sequence within a set of input traffic sequences, and a corresponding similarity threshold. The method may also be used in the extended, multiple-signature generation algorithm shown in FIG. 6 below.

The purpose of the method shown in FIG. 5 is to find a "true positive representative sequence" within a set of data sequences. The true positive representative sequence is a sequence that maximizes the cumulative sequence alignment score, relative to all data sequences in the set. Intuitively, this is the sequence that best describes the entire set in terms of sequence alignment. Another product of the algorithm shown below is a "true positive similarity threshold," below which sequences are regarded as false-positives. The input to the algorithm is a set of data sequences and a number (labeled "FP") denoting the expected fraction of false-positive sequences in the set.

Signature generator 52 begins the method of FIG. 5 by selecting at random a reduced subset of input sequences to be used for subsequent processing, at a subset selection step 110. The number of sequences in the subset depends upon FP and upon the regularity of patterns in the worm traffic payload. For example, for 10% false-positive sequences and assuming relatively regular worms, a subset size of 50-100 sequences has proven to be sufficient. Alternatively, the subset may be smaller or larger, or may even include all the input sequences in the set in cases of high irregularity and low tolerance of false positives. As a general heuristic guideline, the subset size is made large enough so that the probability of finding more than FP*2 false positive sequences within the subset is sufficiently small, for example, on the order of 0.001. For each sequence in the reduced subset, signature generator 52 performs pair-wise sequence alignment against all other sequences in the subset, at an alignment step 112. The alignment calculation may use a method such as "pairwise align," as described in Appendix A below, or any other equivalent algorithm. The signature generator accumulates the resulting sequence alignment scores for each sequence in the subset. The sequence having the maximum cumulative score is chosen as the true positive representative sequence, as a representative selection step 114.

To find the similarity threshold, signature generator 52 determines the sequence alignment score for each sequence in the subset relative to the true positive representative sequence, at a ranking step 116. At the same step, signature generator 52 sorts the subset of sequences in descending order of alignment scores. Signature generator 52 then chooses a sequence near the bottom of the ranking, and assigns its respective alignment score to be the true positive similarity threshold, at a threshold assignment step 118. The distance from the bottom at which this sequence is chosen depends on the value of FP. For example, the sequence ranked FP*2 from the bottom may be used to determine the similarity threshold. The algorithm terminates by returning the selected true positive representative sequence and true positive similarity threshold at a termination step 120.

Figure 6:
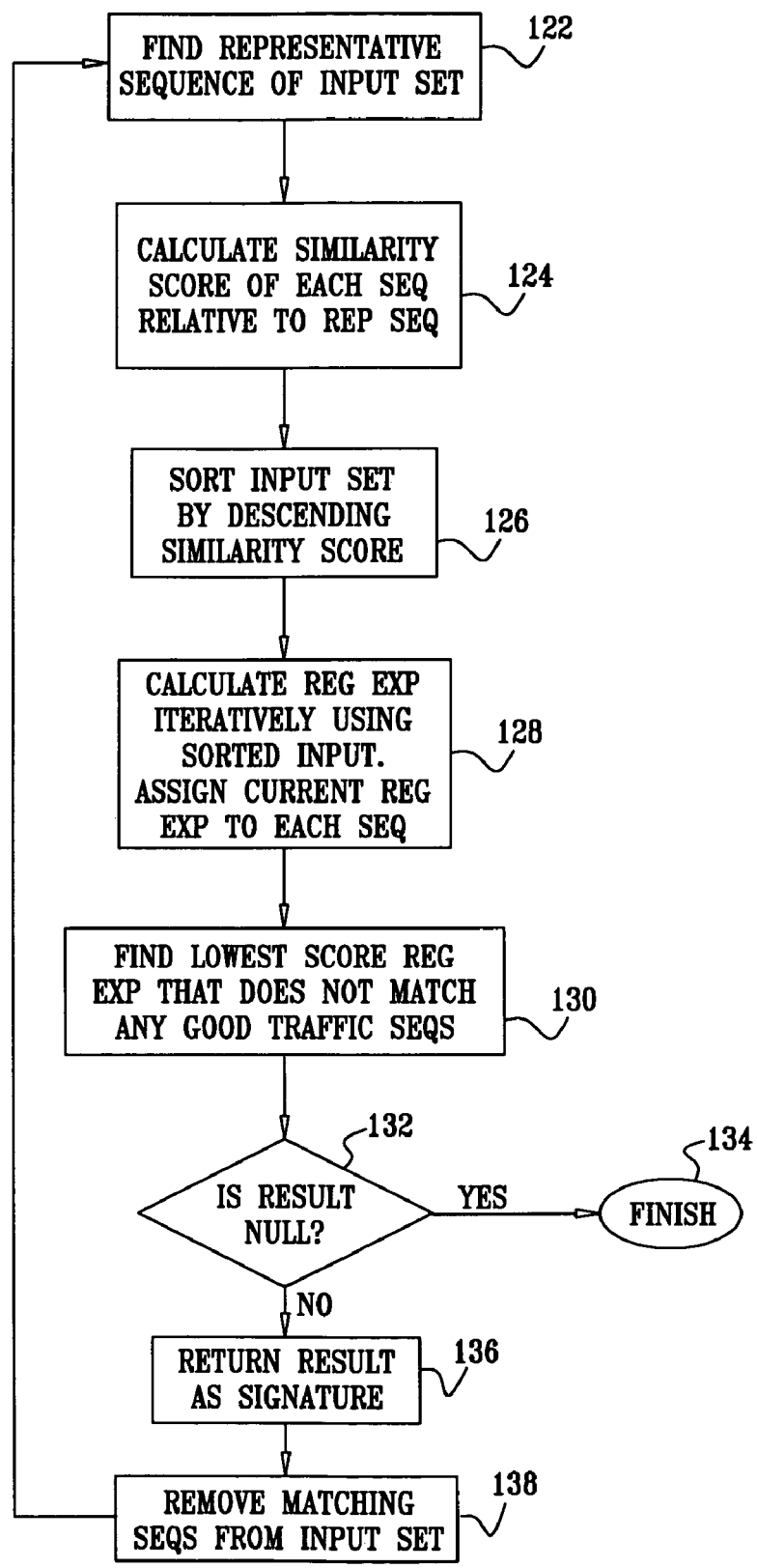
FIG. 6 is a flow chart that schematically illustrates a method for generating multiple worm signatures from a set of input traffic sequences, in accordance with an embodiment of the present invention.

FIG. 6 is a flow chart that schematically illustrates a method for generating multiple worm signatures from a set of input traffic sequences, in accordance with an embodiment of the present invention. In practical scenarios it is possible that two or more different worm attacks appear simultaneously on the same <protocol:port>. The algorithm described hereinbelow generalizes the single-signature generation algorithm shown above in FIG. 4 to the case of multiple signatures.

The principle of operation is as follows:
1. Try to find a regular expression that matches as many attack sequences from the input set as possible, while not matching any innocent sequences. For this purpose, the single-signature generation algorithm shown in FIG. 4 above may be used.
2. After finding such a regular expression, remove all matching attack sequences from the input set.
3. Return to step 1 and try to find an additional regular expression that matches a majority of the remaining attack sequences. Repeat until the input set is empty.

As shown in FIG. 6, signature generator 52 begins by finding a true positive representative sequence at a representative finding step 122. The procedure for finding a true positive representative sequence follows the method described in FIG. 5 above, and is also used by the single-signature generation algorithm described in FIG. 4 above. In the case of multiple-signatures, signature generator 52 does not use the FP parameter and the resulting true positive similarity threshold that were used by the single-signature algorithm of FIG. 4. Instead, signature generator 52 calculates the sequence alignment score of each attack sequence in the input set relative to the true positive representative sequence at a similarity calculation step 124. It then sorts the attack sequences in descending order of sequence alignment scores at an input sorting step 126. The result is a sorted list of sequences, each paired with its sequence alignment score relative to the true positive representative sequence.

Signature generator 52 then passes over the sorted input set sequentially and, for each input sequence, calculates a regular expression that matches the present sequence and all previous input sequences in the list, at an expression calculation step 128. Among the regular expressions found at step 128, signature generator 52 then finds the last regular expression that does not match any of the innocent sequences in the input set, at a lowest score finding step 130. Once found, this regular expression fulfills the conditions of matching as many attack sequences as possible, while not matching any innocent sequences.

Finding this regular expression may follow a "cut-in-half" strategy, as outlined below:
1. Assign current_set to be the entire sorted input set, wherein each sequence is listed with its associated regular expression.
2. Loop while current_set contains more than one sequence:
   a. Test whether the regular expression associated with the sequence in the middle of the set matches any of the innocent sequences.
   b. If "yes," remove from current_set all sequences from and including this middle sequence.
   c. If "no," remove from current_set all sequences up to (but not including) this middle sequence.
   d. If current_set contains more than one sequence, jump back to (a) above.
3. If current_set has no sequences left, the result is NULL.
4. If current_set has one sequence left in it:
   a. If the index of that sequence in the sorted set is too small (relative to a heuristic threshold, 5 in this example), meaning the resulting regular expression is based on 5 sequences only, return NULL. Else:
   b. Test again the associated regular expression against the set of innocent sequences.
   c. If the regular expression matches any innocent sequence, return NULL.
   d. Otherwise, return the associated regular expression as result.

Signature generator 52 checks whether there is a valid regular expression result, which matches some of the attack sequences while not matching any innocent sequences, at a null checking step 132. If the result is positive, i.e., the returned regular expression is null, the algorithm terminates at a termination step 134. Termination of the algorithm may mean that all worm signatures have been found, or that the input set of attack sequences is too small and that it may prove beneficial to record additional attack traffic and run the algorithm again. Typically, a larger input set will be required when multiple worms appear simultaneously.

If the result of null checking step 132 is negative, i.e., a valid regular expression found, the signature generator returns the regular expression as a valid worm signature, at a signature found step 136. The signature generator removes from the set of input attack sequences all the sequences which matched this regular expression, at a sequence removal step 138. The signature generator then returns to representative finding step 122 to find additional regular expressions matching the remaining attack sequences in the input set.

Although the embodiments described above relate specifically to detection and mitigation of worm-related traffic, the principles of the present invention may similarly be applied in detecting and mitigating other types of recurrent malicious traffic. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

APPENDIX A—SEQUENCE AND REGULAR-EXPRESSION ALIGNMENT

This appendix outlines two algorithms that may be used as parts of the signature generation methods described above. The first algorithm finds the best sequence alignment between two input sequences. The second algorithm extends, or updates, a given regular expression, to match an additional given sequence.

Pairwise-Align

Input:

Seq1: a first sequence of extended-bytes (extended-bytes contain normal byte value 0-255, plus extended character codes required for regular expressions, such as "*" or "?".)

Seq2: a second sequence of extended bytes.

Output:

An optimal alignment of Seq1 and Seq2, and the sequence alignment score of that alignment.

Algorithm:

Dynamic programming is used to perform "local sequence alignment," as described in many molecular biology related algorithms. One example is given by Shamir in "Algorithms for Molecular Biology" (Tel-Aviv University, Lecture 2, November 2001), which is incorporated herein by reference.

Optimizations:

The algorithm may be optimized by performing multi-byte comparisons. This method is especially useful when only exact matches are allowed to contribute to the alignment score (while disallowing alignment of different characters.) The algorithm may also be extended to implementations that allow certain matching of different characters (e.g. aligning "a" with "A").

Algorithm "Reg-Exp Align"

Input:

reg_exp: a regular expression.

seq: a character sequence.

Output:

A regular expression that extends the input regular expression reg_exp, so that it also matches the input sequence seq.

Algorithm:

Perform pairwise alignment between reg_exp and seq. Note that adding gaps in places where reg_exp contains the special character "*" or "?" contributes to the alignment score as extending an existing gap (rather than opening a new gap).

Calculate score properly for [<char-set>] matches (i.e., matches in which reg_exp allows a character to match any character from the group of characters in <char-set>).

Scan the resulting alignment. Replace multi-byte gaps with the "*" special character. Replace single-byte gaps with the "?" special character. Where different characters are aligned, change to [the-different-characters].

Alignment Scoring Rules

One typical set of rules for assigning scores to character matches is to assign a score of +10 to match identical characters, and -1000 to match non-identical characters. This strategy gives preference to opening large gaps over matching non-identical characters.

In some applications, a +5 score is assigned to a match between different cases of the same letter (e.g. matching "a" with "A"). Another strategy may be to score +2 for a match between any two alphabetical characters or any two numerical characters. Creation of a new gap typically contributes -10 to the sequence alignment score. Extending an existing gap typically contributes -1 to the score. These numbers are heuristic by nature and are subject to further tuning and experimentation.

The invention claimed is:

1. A computer-implemented method for mitigating attacks of malicious traffic in a computer network, comprising:
    receiving a set of attack sequences, comprising first traffic sequence suspected of containing the malicious traffic;
    analyzing the attack sequences so as to automatically extract a regular expression that matches at least a portion of the attack sequences in the set;
    comparing second traffic sequences to the regular expression in order to identify the second traffic sequences that contain the malicious traffic; and
    establishing a connection with a source computer that is transmitting the set of attack sequences, thus soliciting the source computer to generate additional malicious traffic, and collecting the additional malicious traffic while blocking further transmission of the malicious traffic through the network.

2. The method according to claim 1, wherein receiving the set of attack sequences comprises:
    analyzing communications traffic in the computer network to establishing a baseline behavior pattern;

detecting a deviation from the baseline behavior pattern that is indicative of an attack; and collecting the attack sequences in response to the deviation.

3. The method according to claim 2, wherein detecting the deviation comprises identifying a source address of the malicious traffic, and wherein collecting the attack sequences comprises recording the malicious traffic received from the source address.

4. The method according to claim 1, and comprising receiving a set of innocent sequences, having a high likelihood of not containing any malicious traffic, wherein analyzing the attack sequences comprises determining the regular expression so that the regular expression does not match any of the innocent sequences.

5. The method according to claim 1, wherein receiving the set of attack sequences comprises receiving data packets transmitted over the network, and wherein analyzing the attack sequences comprises extracting and processing message payloads from the data packets.

6. The method according to claim 1, wherein analyzing the attack sequences comprises:

finding a representative sequence in the set of attack sequences; and comparing the attack sequences to the representative sequence in order to generate the regular expression.

7. The method according to claim 6, wherein finding the representative sequence comprises:

choosing a subset of the set of attack sequences;

determining a cumulative alignment score for each attack sequence in the subset by aligning each attack sequence in the subset relative to other attack sequences in the subset; and selecting the attack sequence in the subset having a maximal cumulative alignment score.

8. The method according to claim 6, wherein comparing the attack sequences to the representative sequence comprises aligning and finding a respective alignment score of each attack sequence relative to the representative sequence.

9. The method according to claim 8, wherein comparing the attack sequences comprises determining a true positive similarity threshold, and discarding the attack sequences having respective alignment scores below the true positive similarity threshold.

10. The method according to claim 9, wherein determining the true positive similarity threshold comprises:

defining an expected fraction of false positive traffic sequences in the set of attack sequences;

ranking the attack sequences in order of the respective alignment scores;

selecting a position in the order responsively to the expected fraction; and picking the alignment score of the attack sequence that is ranked in the selected position in the order to be the true positive similarity threshold.

11. The method according to claim 6, wherein comparing the attack sequences to the representative sequence comprises generating the regular expression by extending the representative sequence to match the attack sequences.

12. The method according to claim 11, and comprising receiving a set of innocent sequences, having a high likelihood of not containing any malicious traffic, wherein generating the regular expression comprises extending the representative sequence so as to match a maximal number of the attack sequence while not matching the innocent sequences.

13. The method according to claim 1, wherein analyzing the attack sequences comprises:

generating a first regular expression that matches a number of the attack sequences;

removing from the set of attack sequences all the attack sequences that match the first regular expression, thereby generating a reduced set of the attack sequences; and generating at least a second regular expression using the reduced set.

14. The method according to claim 1, and comprising:

receiving an additional set of attack sequences; and refining the regular expression using the additional set of attack sequences.

15. The method according to claim 14, wherein refining the regular expression comprises extending the regular expression to match at least a portion of the additional set of attack sequences.

16. The method according to claim 1, and comprising preventing further transmission through the network of the second traffic sequences that are identified, using the regular expression, as containing the malicious traffic.

17. The method according to claim 16, wherein preventing the further transmission comprises identifying a source address of the malicious traffic and blocking further traffic originating from the source address.

18. The method according to claim 1, wherein receiving the attack sequences comprises receiving an indication that an attack has begun, and collecting the attack sequences responsively to the indication, and wherein analyzing the attack sequences comprises generating the regular expression within one minute of receiving the indication.

19. The method according to claim 18, wherein generating the regular expression comprises generating the regular expression within five seconds of receiving the indication.

20. Apparatus for mitigating attacks of malicious traffic in a computer network, comprising: a guard device, wherein the guard device is adapted to receive a set of attack sequences, comprising first traffic sequences suspected of containing the malicious traffic, to analyze the attack sequences so as to automatically extract a regular expression that matches at least a portion of the attack sequences in the set, and to compare second traffic sequences to the regular expression in order to identify the second traffic sequences that contain the malicious traffic and wherein the guard device is further adapted to establish a connection with a source computer that is transmitting the set of attack sequences, thus soliciting the source computer to generate additional malicious traffic, and to collect the additional malicious traffic while blocking further transmission of the malicious traffic through the network.

21. Apparatus according to claim 20, wherein the guard device comprises an anomaly detector, which is adapted to analyze communications traffic in the computer network, to establish a baseline behavior pattern, to detect a deviation from the baseline behavior pattern that is indicative of an attack, and to collect the attack sequences in response to the deviation.

22. Apparatus according to claim 21, wherein the anomaly detector is arranged to identify a source address of the malicious traffic, and to record the malicious traffic received from the source address.

23. Apparatus according to claim 20, wherein the guard device is adapted to receive a set of innocent sequences, having a high likelihood of not containing any malicious traffic, and comprising a signature generator, which is adapted to determine the regular expression so that the regular expression does not match any of the innocent sequences.

24. Apparatus according to claim 20, wherein the guard device is adapted to receive data packets transmitted over the network, to extract and to process message payloads from the data packets.

25. Apparatus according to claim 20, wherein the guard device comprises a signature generator, which is adapted to find a representative sequence in the set of attack sequences and to compare the attack sequences to the representative sequence in order to generate the regular expression.

26. Apparatus according to claim 25, wherein the signature generator is adapted to find the representative sequence by choosing a subset of the set of attack sequences, determining a cumulative alignment score for each attack sequence in the subset by aligning each attack sequence in the subset relative to other attack sequences in the subset, and selecting the attack sequence in the subset having a maximal cumulative alignment score.

27. Apparatus according to claim 25, wherein the signature generator is adapted to compare the attack sequences to the representative sequence by aligning and finding a respective alignment score of each attack sequence, relative to the representative sequence.

28. Apparatus according to claim 27, wherein the signature generator is arranged to determine a true positive similarity threshold, and to discard the attack sequences having respective alignment scores below the true positive similarity threshold.

29. Apparatus according to claim 28, wherein the signature generator is adapted to receive a definition of an expected fraction of false positive traffic sequences in the set of attack sequences, and to rank the attack sequences in order of the respective alignment scores, select a position in the order responsively to the expected fraction and pick the alignment score of the attack sequence that is ranked in the selected position in the order to be the true positive similarity threshold.

30. Apparatus according to claim 25, wherein the signature generator is adapted to generate the regular expression by extending the representative sequence to match the attack sequences.

31. Apparatus according to claim 30, wherein the signature generator is adapted to receive a set of innocent sequences, having a high likelihood of not containing any malicious traffic, and to extend the representative sequence so as to match a maximal number of the attack sequence while not matching the innocent sequences.

32. Apparatus according to claim 20, wherein the guard device comprises a signature generator, which is adapted to generate a first regular expression that matches a number of the attack sequences, removes from the set of attack sequences all the attack sequences that match the first regular expression, thereby generating a reduced set of the attack sequences, and generates at least a second regular expression using the reduced set.

33. Apparatus according to claim 20, wherein the guard device is adapted to receive an additional set of attack sequences and to refine the regular expression using the additional set of attack sequences.

34. Apparatus according to claim 33, wherein the guard device is adapted to extend the regular expression to match at least a portion of the additional set of attack sequences.

35. Apparatus according to claim 20, wherein the guard device comprises an intrusion prevention system, which is adapted to prevent further transmission through the network of the second traffic sequences that are identified, using the regular expression, as containing the malicious traffic.

36. Apparatus according to claim 35, wherein the guard device is adapted to identify a source address of the malicious traffic, and wherein the intrusion prevention system is adapted to block the further traffic originating from the source address.

37. Apparatus according to claim 20, wherein the guard device is adapted to receive an indication that an attack has begun, to collect the attack sequences responsively to the indication, and to generate the regular expression within one minute of receiving the indication.

38. Apparatus according to claim 37, wherein the guard device is adapted to generate the regular expression within five seconds of receiving the indication.

39. A computer software product for mitigating attacks of malicious traffic in computer networks, the product comprising a computer-readable medium in which program instructions are stored, which instructions, when read by a computer, cause the computer to receive a set of attack sequences, comprising first traffic sequences suspected of containing the malicious traffic, to analyze the attack sequences so as to automatically extract a regular expression that matches at least a portion of the attack sequences in the set, and to compare second traffic sequences to the regular expression in order to identify the second traffic sequences that contain the malicious traffic, and further wherein the instructions cause the computer to establish a connection with a source computer that is transmitting the set of attack sequences, thus soliciting the source computer to generate additional malicious traffic, and to collect the additional malicious traffic while blocking further transmission of the malicious traffic through the network.

40. The product according to claim 39, wherein the instructions cause the computer to establish a baseline behavior pattern, to detect a deviation from the baseline behavior pattern that is indicative of an attack, and to collect the attack sequences in response to the deviation.

41. The product according to claim 40, wherein the instructions cause the computer to identify a source address of the malicious traffic, and to record the malicious traffic received from the source address.

42. The product according to claim 39, wherein the instructions cause the computer to receive a set of innocent sequences, having a high likelihood of not containing any malicious traffic, and to determine the regular expression so that the regular expression does not match any of the innocent sequences.

43. The product according to claim 39, wherein the instructions cause the computer to receive data packets transmitted over the network, to extract and to process message payloads from the data packets.

44. The product according to claim 39, wherein the instructions cause the computer to find a representative sequence in the set of attack sequences and to compare the attack sequences to the representative sequence in order to generate the regular expression.

45. The product according to claim 44, wherein the instructions cause the computer to find a representative sequence by choosing a subset of the set of attack sequences, determining a cumulative alignment score for each attack sequence in the subset by aligning each attack sequence in the subset relative to other attack sequences in the subset, and selecting the attack sequence in the subset having a maximal cumulative alignment score.

46. The product according to claim 44, wherein the instructions cause the computer to compare the attack sequences to the representative sequence by aligning and finding a respective alignment score of each attack sequence, relative to the representative sequence.

47. The product according to claim 46, wherein the instructions cause the computer to determine a true positive similarity threshold, and to discard the attack sequences having respective alignment scores below the true positive similarity threshold.

48. The product according to claim 47, wherein the instructions cause the computer to define an expected fraction of false positive traffic sequences in the set of attack sequences, to rank the attack sequences in order of the respective alignment scores, to select a position in the order responsively to the expected fraction, and to pick the alignment score of the attack sequence that is ranked in the selected position in the order to be the true positive similarity threshold.

49. The product according to claim 44, wherein the instructions cause the computer to generate the regular expression by extending the representative sequence to match the attack sequences.

50. The product according to claim 49, wherein the instructions cause the computer to receive a set of innocent sequences, having a high likelihood of not containing any malicious traffic, and to extend the representative sequence so as to match a maximal number of the attack sequence while not matching the innocent sequences.

51. The product according to claim 39, wherein the instructions cause the computer to generate a first regular expression that matches a number of the attack sequences, to remove from the set of attack sequences all the attack sequences that match the first regular expression, thereby generating a reduced set of the attack sequences, and to generate at least a second regular expression using the reduced set.

52. The product according to claim 39, wherein the instructions cause the computer to receive an additional set of attack sequences and to refine the regular expression using the additional set of attack sequences.

53. The product according to claim 52, wherein the instructions cause the computer to extend the regular expression to match at least a portion of the additional set of attack sequences.

54. The product according to claim 39, wherein the instructions cause the computer to prevent further transmission through the network of the second traffic sequences that are identified, using the regular expression, as containing the malicious traffic.

55. The product according to claim 54, wherein the instructions cause the computer to identify a source address of the malicious traffic and to block the further traffic originating from the source address.

56. The product according to claim 39, wherein the instructions cause the computer to receive an indication that an attack has begun, to collect the attack sequences responsively to the indication, and to generate the regular expression within one minute of receiving the indication.

57. The product according to claim 56, wherein the instructions cause the computer to generate the regular expression within five seconds of receiving the indication.

58. Apparatus for mitigating attacks of malicious traffic in a computer network, comprising:
at least one of computer-readable memory and computer-readable media;
receiving means for receiving a set of attack sequences, comprising first traffic sequences suspected of containing the malicious traffic;
analyzing means configured for obtaining said first traffic sequences from said receiving mean, for analyzing the attack sequences so as to automatically extract a regular expression that matches at least a portion of the attack sequences in the set; and
comparing means for comparing second traffic sequences to the regular expression obtained from said analyzing means in order to identify the second traffic sequences that contain the malicious traffic,
wherein the receiving means comprise means for establishing a connection with a source computer that is transmitting the set of attack sequences, thus soliciting the source computer to generate additional malicious traffic, and means for collecting the additional malicious traffic while blocking further transmission of the malicious traffic through the network.

59. Apparatus according to claim 58, wherein the means for receiving the set of attack sequences comprise:
means for analyzing communications traffic in the computer network to establishing a baseline behavior pattern;
means for detecting a deviation from the baseline behavior pattern that is indicative of an attack; and
means for collecting the attack sequences in response to the deviation.

60. Apparatus according to claim 59, wherein the means for detecting the deviation comprise means for identifying a source address of the malicious traffic, and wherein the means for collecting the attack sequences comprise means for recording the malicious traffic received from the source address.

61. Apparatus according to claim 58, and comprising means for receiving a set of innocent sequences, having a high likelihood of not containing any malicious traffic, wherein the means for analyzing the attack sequences comprise means for determining the regular expression so that the regular expression does not match any of the innocent sequences.

62. Apparatus according to claim 58, wherein the means for receiving the set of attack sequences comprise means for receiving data packets transmitted over the network, and wherein the means for analyzing the attack sequences comprise means for extracting and processing message payloads from the data packets.

63. Apparatus according to claim 58, wherein the means for analyzing the attack sequences comprise:
means for finding a representative sequence in the set of attack sequences; and
means for comparing the attack sequences to the representative sequence in order to generate the regular expression.

64. Apparatus according to claim 63, wherein means for finding the representative sequence comprise:
means for choosing a subset of the set of attack sequences;
means for determining a cumulative alignment score for each attack sequence in the subset by aligning each attack sequence in the subset relative to other attack sequences in the subset; and
means for selecting the attack sequence in the subset having a maximal cumulative alignment score.

65. Apparatus according to claim 63, wherein the means for comparing the attack sequences to the representative sequence comprise means for aligning and finding a respective alignment score of each attack sequence relative to the representative sequence.

66. Apparatus according to claim 65, wherein the means for comparing the attack sequences comprise means for determining a true positive similarity threshold, and discarding the attack sequences having respective alignment scores below the true positive similarity threshold.

67. Apparatus according to claim 66, wherein the means for determining the true positive similarity threshold comprise:

means for defining an expected fraction of false positive traffic sequences in the set of attack sequences;

means for ranking the attack sequences in order of the respective alignment scores;

means for selecting a position in the order responsively to the expected fraction; and means for picking the alignment score of the attack sequence that is ranked in the selected position in the order to be the true positive similarity threshold.

68. Apparatus according to claim 63, wherein the means for comparing the attack sequences to the representative sequence comprise means for generating the regular expression by extending the representative sequence to match the attack sequences.

69. Apparatus according to claim 68, and comprising means for receiving a set of innocent sequences, having a high likelihood of not containing any malicious traffic, wherein the means for generating the regular expression comprise means for extending the representative sequence so as to match a maximal number of the attack sequence while not matching the innocent sequences

70. Apparatus according to claim 58, wherein the means for analyzing the attack sequences comprise:

means for generating a first regular expression that matches a number of the attack sequences;

means for removing from the set of attack sequences all the attack sequences that match the first regular expression, thereby generating a reduced set of the attack sequences; and means for generating at least a second regular expression using the reduced set.

71. Apparatus according to claim 58, and comprising:

means for receiving an additional set of attack sequences; and means for refining the regular expression using the additional set of attack sequences.

72. Apparatus according to claim 71, wherein the means for refining the regular expression comprise means for extending the regular expression to match at least a portion of the additional set of attack sequences.

73. Apparatus according to claim 58, and comprising means for preventing further transmission through the network of the second traffic sequences that are identified, using the regular expression, as containing the malicious traffic.

74. Apparatus according to claim 73, wherein the means for preventing the further transmission comprise means for identifying a source address of the malicious traffic and means for blocking further traffic originating from the source address.

75. Apparatus according to claim 58, wherein the means for receiving the attack sequences comprise means for receiving an indication that an attack has begun, and means for collecting the attack sequences responsively to the indication, and wherein the means for analyzing the attack sequences comprise means for generating the regular expression within one minute of receiving the indication.

76. Apparatus according to claim 75, wherein the means for generating the regular expression comprise means for generating the regular expression within five seconds of receiving the indication.

* * * * *